(12) United States Patent
Djekic-Ivankovic

(10) Patent No.: US 10,820,603 B2
(45) Date of Patent: Nov. 3, 2020

(54) PRUNE-BASED NUTRIENT-RICH MATERIALS AND RELATED PROCESSES

(71) Applicant: Marija Djekic-Ivankovic, Montreal (CA)

(72) Inventor: Marija Djekic-Ivankovic, Montreal (CA)

(*) Notice: Subject to any disclaimer, the term of this patent is extended or adjusted under 35 U.S.C. 154(b) by 316 days.

(21) Appl. No.: 16/012,112

(22) Filed: Jun. 19, 2018

(65) Prior Publication Data

US 2018/0360062 A1 Dec. 20, 2018

Related U.S. Application Data

(60) Provisional application No. 62/521,668, filed on Jun. 19, 2017.

(51) Int. Cl.
- *A23B 7/02* (2006.01)
- *A23P 30/20* (2016.01)
- *A23L 19/00* (2016.01)

(52) U.S. Cl.
CPC .......... *A23B 7/02* (2013.01); *A23L 19/09* (2016.08); *A23P 30/20* (2016.08); *A23V 2002/00* (2013.01)

(58) Field of Classification Search
CPC .............. A23L 19/09; A23P 30/20; A23B 7/02
USPC ........................................ 426/640
See application file for complete search history.

(56) References Cited

U.S. PATENT DOCUMENTS

| | | |
|---|---|---|
| 1,999,533 A | 4/1935 | Boyd |
| 2,023,536 A | 12/1935 | Moore |
| 2,110,184 A | 3/1938 | Webb |
| 2,124,896 A | 7/1938 | Daniel |
| 2,352,108 A | 6/1944 | La Vine |
| 2,943,680 A | 7/1960 | Scott, Jr. et al. |
| 3,211,557 A | 10/1965 | Nury et al. |
| 3,800,049 A | 3/1974 | Larroche et al. |
| 4,341,803 A | 7/1982 | Koshida et al. |
| 4,371,562 A | 2/1983 | Posorske |
| 5,534,280 A | 7/1996 | Welch |
| 5,932,270 A | 8/1999 | Rock et al. |
| 6,183,795 B1 | 2/2001 | Yates |
| 8,456,950 B2 | 6/2013 | Hegna |
| 2003/0012862 A1 | 1/2003 | Ayres |
| 2006/0040001 A1 | 2/2006 | Johnson |
| 2006/0165746 A1 | 7/2006 | Markus et al. |
| 2006/0286270 A1 | 12/2006 | Jordan |
| 2007/0224317 A1 | 9/2007 | Hanszmann |
| 2008/0003340 A1 | 1/2008 | Karwowski et al. |
| 2008/0274263 A1 | 11/2008 | Mazin |
| 2009/0110773 A1 | 4/2009 | Dwivedi |
| 2009/0110780 A1 | 4/2009 | Sanchez et al. |
| 2014/0308374 A1 | 10/2014 | Goel |

FOREIGN PATENT DOCUMENTS

| | | |
|---|---|---|
| CN | 1541557 A | 11/2004 |
| CN | 1663403 A | 9/2005 |
| CN | 102132805 A | 7/2011 |
| CN | 102150932 A | 8/2011 |
| CN | 102187982 A | 9/2011 |
| CN | 103815005 A | 5/2014 |
| CN | 104116058 A | 10/2014 |
| CN | 104286148 A | 1/2015 |
| CN | 105192051 A | 12/2015 |
| CN | 105639681 A | 6/2016 |
| EP | 2225949 B1 | 11/2013 |
| FR | 1482800 A | 5/1967 |
| JP | H07115931 | 5/1995 |
| JP | 2004121136 A | 4/2004 |
| JP | 2004154035 | 6/2004 |
| JP | 2006325403 A | 12/2006 |
| JP | 2008099679 A | 5/2008 |
| JP | 3156433 U | 1/2010 |
| JP | 2012016310 A | 1/2012 |
| JP | 2016021910 A | 2/2016 |
| JP | 2016182041 | 10/2016 |
| WO | 2011154824 A2 | 5/2012 |

*Primary Examiner* — Jyoti Chawla

(74) *Attorney, Agent, or Firm* — Boardman & Clark LLP

(57) ABSTRACT

A prune paste and related process including drying plums according to a temperature profile tailored to produce prunes retaining at least 75% of nutrients from the plums (vitamin K, vitamin C, and minerals comprising iron, potassium and phosphorus). A prune-based product and related process including the combination of the prune paste and at least one nutrient-rich material comprising beans, seeds, spices and concentrates of nutrients. The at least one nutrient-rich material may be selected to synergistically enhance bioavailability of other specific nutrients from the prune paste. The prune-based product may be consumed to reduce constipation, iron deficiency or insufficiency, osteoporosis and related bone diseases and/or cardiovascular risks.

20 Claims, 2 Drawing Sheets

PRUNE-BASED NUTRIENT-RICH MATERIALS AND RELATED PROCESSES

TECHNICAL FIELD

The technical field generally relates to nutrient-containing materials, and more particularly to prune-based materials and related production processes.

BACKGROUND

A plum is a fruit of the genus *Prunus*. European plum (*Prunus domestica*) and Japanese plum (*Prunus salicina* and hybrids) are of commercial significance across the globe.

Plums have been described as food with health-promoting properties. According to scientific research data, plums have been shown to possess laxative, antioxidant, anti-allergic and anti-inflammatory characteristics. These effects have been attributed to high fiber and phenolic content, mostly the anthocyanins, which are known to be natural antioxidants. Recently, prune consumption has been associated with improved cognitive function, bone health parameters and cardiovascular risk factors. Most of the human trials used the dried form of plums rather than fresh fruit, thus promoting dried plums in a healthy diet. Dried form of plums is commonly called prunes.

A typical industrial plum drying process includes drying whole plums at a first temperature between 85° C. and 95° C. for a period of 19 hours to 23 hours in order to produce a dried plum having a level of moisture between 19% and 23%. Processes further include Aeration Water Treatment of the dried plum at a second temperature of 90° C. During this treatment step, water is added to the dried plum to produce a prune having a moisture content between 33% and 40% to enable mechanical pit removal. Preservation of desired nutrients is jeopardized during these rehydration and high temperature treatment steps. More particularly, vitamins, carbohydrates, anthocyanins are nutrients that may be modified or degraded. Then, pit is mechanically removed. Several mechanical pit removal devices have been developed but presence of pit residuals is not possible to control.

Challenges remain to produce fruit-based products, especially prune-based products, while preserving nutrients of the fruit so as to fully provide their health benefits.

SUMMARY

In one aspect, there is provided a process for producing a prune-based product from plums, the process comprising:
  manually removing pit, petiole and residue from the plums to produce cleaned plums;
  drying the cleaned plums according to a temperature profile tailored to produce prunes retaining at least 75% of nutrients from the plums, the nutrients comprising vitamin K, vitamin C, iron, potassium and phosphorus; and
  combining the prunes with at least one nutrient-rich material to produce the prune-based product having a moisture content between 15 wt % and 30 wt %.

In some implementations, combining the prunes with the at least one-nutrient rich ingredient comprises grinding the prunes to produce an extrudable prune paste having a moisture content between 20 wt % and 30 wt %; and then mixing the prune paste with the at least one nutrient-rich material.

In other implementations, combining the prunes with the at least one-nutrient rich ingredient comprises mixing the prunes with the at least one nutrient-rich material to produce a prune-based mixture; and then grinding the prune-based mixture to produce an extrudable prune paste having a moisture content between 20 wt % and 30 wt %.

In another aspect, there is provided a process for producing a prune-based product from plums, the process comprising:
  manually removing pit, petiole and residue from the plums to produce cleaned plums;
  drying the cleaned plums according to a temperature profile tailored to produce prunes retaining at least 75% of nutrients from the plums, the nutrients comprising vitamin K, vitamin C, iron, potassium and phosphorus;
  grinding the prunes to produce an extrudable prune paste having a moisture content between 20 wt % and 30 wt %;
  combining the prune paste with at least one nutrient-rich material to produce a prune-based mixture;
  shaping the prune-based mixture into a desired shape of the prune-based product; and
  drying the shaped prune-based mixture to obtain the prune-based product having a moisture content between 15 wt % and 30 wt %.

In another aspect, there is provided a process for producing a prune paste from plums, the process comprising:
  manually removing pit, petiole and any residue from the plums to produce cleaned plums;
  drying the cleaned plums according to a temperature profile tailored to produce prunes retaining at least 75% of specific vitamins and other nutrients from the plums; and
  grinding the prunes to produce an extrudable prune paste having a moisture content between 20 wt % and 30 wt %.

In some implementations, the drying comprises:
subjecting the plums to a first temperature level during a first period; and
subjecting the plums to a second temperature level during a second period;
the second temperature level and second duration being lower than the first temperature level and first duration respectively, to produce prunes having a moisture content between 25 wt % and 35 wt %.

The first temperature level may be between 40° C. and 65° C. and the first duration may be between 8 hours and 12 hours. Optionally, the first temperature level is about 55° C. and the first duration is about 10 hours. The second temperature level may be between 30° C. and 60° C. and the second duration may be between 3 hours and 5 hours. Optionally, the second temperature level is about 45° C. and the second duration is about 4 hours.

In some implementations, the drying may be performed at atmospheric pressure in a conventional dryer. The drying can comprise organizing the cleaned plums as a one-layer structure to enhance drying thereof.

In some implementations, the grinding may comprise sieving the prune paste

In some implementations, manually removing pit, petiole and any residue from the plums may comprise cutting each plum to create an aperture sized to enable removal of the pit. Optionally, the process further comprises closing the aperture created by the cut after removal of the pit to reduce juice leakage therefrom. In addition, manually removing pit, petiole and any residue from the plums may comprise screening the plums to detect any remaining residue and undesirable plum condition.

In another aspect, there is provided a process for producing a fruit paste from pitted fruits, the process comprising:
manually removing pit, petiole and any residue from the fruit to produce cleaned fruits;
drying the cleaned fruits according to a temperature profile tailored to produce dried fruits retaining at least 75% of specific vitamins and other nutrients from the fruits; and
grinding the dried fruits to produce an extrudable fruit paste having a moisture content between 20 wt % and 30 wt %.

In another aspect, there is provided a prune paste produced by the process defined herein.

In some implementations, the prune paste may have a moisture content between 20 wt % and 30 wt %. Optionally, the prune paste has a vitamin K content between 48 µg to 60 µg, a potassium content between 1000 mg and 1250 mg, a vitamin C content between 5 mg and 10 mg, a glucose content of at most 25% and a fructose content of at most 20% per 100 g of prune paste. Further optionally, the prune paste may contain nutrients at a level substantially similar to the plums, the nutrients including vitamins comprising vitamin K and vitamin C, and minerals comprising iron, potassium and phosphorus.

In some implementations, the plums may be ripe plums. Optionally, the plums may be organic plums. Further optionally, the plums may be non-GMO plums.

In another aspect, there is provided a process for producing a prune-based product from plums, the process comprising:
manually removing pit, petiole and any residue from the plums to produce cleaned plums;
drying the cleaned plums according to a temperature profile tailored to reduce degradation of nutrients from the plums and produce prunes;
grinding the prunes to produce an extrudable prune paste;
combining the prune paste with at least one nutrient-rich material to produce a prune-based mixture;
shaping the prune-based mixture into a desired shape of the prune-based product; and
drying the shaped prune-based mixture to obtain the prune-based product having a moisture content between 15 wt % and 30 wt %.

In some implementations, combining the prune paste with the at least one nutrient-rich material may be performed with at least 50 wt % of prune paste, optionally with at least 80 wt % of prune paste.

In some implementations, combining the prune paste with the at least one nutrient-rich material may comprise selecting the at least one nutrient-rich material to synergistically enhance bioavailability of specific nutrients from the prune-based mixture.

In some implementations, combining the prune paste with the at least one nutrient-rich material may comprise mixing the prune paste with the at least one nutrient-rich material at a speed reducing or minimizing degradation of nutrients. Optionally, combining the prune paste with the at least one nutrient-rich material may comprise mixing the prune paste with the at least one nutrient-rich material at a temperature between 25° C. and 35° C.

In some implementations, shaping the prune-based mixture may comprise extruding the prune-based mixture into a bar shape, a spaghetti shape, a band shape or analogs thereof. Optionally, shaping the prune-based mixture may comprise cutting the prune-based mixture to produce bar segments, bite-sized segments, spaghettis of given length and analogs thereof.

In some implementations, the process may further comprise coating the shaped prune-based mixture with at least one layer of another nutrient-rich material.

In some implementations, the drying of the prune-based mixture may be performed at room temperature.

In another aspect, there is provided a process for producing a prune-based product from the prune paste as defined herein, the process comprising:
combining the prune paste with at least one nutrient-rich material to produce a prune-based mixture;
shaping the prune-based mixture into a desired shape of the prune-based product; and
drying the shaped prune-based mixture to obtain the prune-based product having a moisture content between 15 wt % and 30 wt %.

In another aspect, there is provided a prune-based product produced by the process defined herein.

In another aspect, there is provided a prune-based product including at least 50% of a prune paste as defined herein, and at most 50% of at least one nutrient-rich material.

In some implementations, the at least one nutrient-rich material may be selected to synergistically enhance bioavailability of a nutrient from the prune-based product. Optionally, the at least one nutrient-rich material may comprise seeds, beans, other fruits, vegetables and spices.

In some implementations, the prune-based product may comprise at most 50 wt % of beans or/and seeds, and at most 4 wt % of spices. Optionally, the beans are cocoa beans in the form of cocoa powder and the seeds comprise chia seeds, sesame seeds, flax seeds, raspberry seeds, blackberry seeds, chokeberry seeds or related seeds.

Optionally, the prune-based product may be shaped as a bar, a bite-sized bar segment, a spaghetti, a band or analogs thereof.

In some implementations, the prune-based product may have a non-heme iron content between 8 mg and 20 mg (minimum 45% of daily value needs), a vitamin K content between 40 µg and 52 µg (minimum 50% of daily value needs), a vitamin C content between 4 mg and 10 mg, a potassium content between 800 mg and 1300 mg/100 g, a calcium content between 95 and 500 mg per 100 g of prune-based product, and having a content of available simple sugars (glucose and fructose) decreased by at least 5% in comparison to traditional prunes.

In another aspect, there is provided a use of the prune-based product as defined herein, as a natural supplement or functional food product rich in specific nutrients capable to reduce or prevent constipation, iron deficiency or insufficiency, osteoporosis and related bone diseases and/or cardiovascular risks.

In another aspect, there is provided a use of the prune-based product as defined herein for cooking, for food preparation, or as a ready-to-eat product.

In another aspect, there is provided a method to produce a fruit-based product, the method comprising:
producing a fruit paste by the process as defined herein; and
selecting at least one nutrient-rich material which synergistically enhances bioavailability of specific nutrients from the fruit-based product;
combining the at least one nutrient-rich material with at least 80 wt % of the fruit paste to produce the fruit-based product.

Optionally, the process may further comprise conditioning the fruit-based product to preserve integrity of the nutrients and the moisture content of the fruit paste.

In another aspect, there is provided a prune-based bar comprising at least 50 wt % of prune paste having a moisture content between 15% and 30%, the prune paste being derived from plums dried and grinded at temperatures below 60° C. Optionally, the prune-based bar may have a non-heme iron content between 8 mg and 20 mg, a vitamin K content between 40 µg and 55 µg, a vitamin C content between 4 mg and 7.5 mg, a potassium content between 800 mg and 1300 mg, a calcium content between 100 and 500 mg per 100 g of prune-based product, and a content of available simple sugars decreased by at least 5% in comparison to traditional prunes.

In another aspect, there is provided a prune-based product comprising at least 80 wt % prune paste having a moisture content between 20% and 30%, a non-heme iron content between 10 mg and 20 mg, a vitamin K content between 48 µg and 60 µg, a vitamin C content between 5 mg and 10 mg, a potassium content between 1000 mg and 1250 mg, a calcium content between 100 and 150 mg per 100 g of prune-based product, and a content of available simple sugars decreased by at least 10% in comparison to traditional prunes.

In some implementations, the prune-based product may be shaped as a bar, a bite-sized bar segment, a spaghetti, a band or analogs thereof.

Optionally, the prune-based product may further comprise at least one nutrient-rich material being seeds, beans, other fruits, vegetables, spices, at least one concentrate of a nutrient or a combination thereof. Further optionally, the at least one concentrate of a nutrient includes vitamin D, vitamin A, calcium or a combination thereof.

In another aspect, there is provided a process for producing a prune paste from plums, the process comprising:
  manually removing pit, petiole and any residue from the plums to produce cleaned plums;
  drying the cleaned plums according to a temperature profile tailored to produce prunes having a content of available simple sugars decreased by at least 5% in comparison to traditional prunes; and
  grinding the prunes to produce an extrudable prune paste having a moisture content between 20 wt % and 30 wt %.

Optionally, the content of available simple sugars may be decreased by at least 10% in comparison to traditional prunes.

The objects, advantages and other features of the present invention will become more apparent and be better understood upon reading of the following non-restrictive description of the invention, given with reference to the accompanying drawings.

Figure 1:
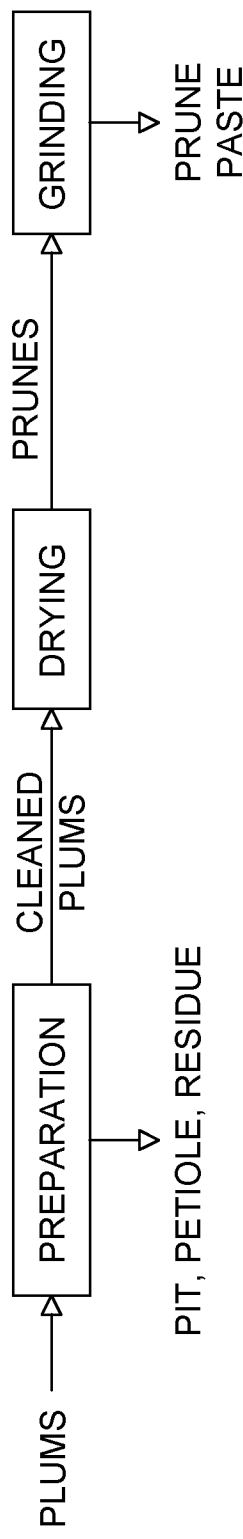
FIG. 1 is a schematic diagram of general process steps to produce prune paste.

While the invention will be described in conjunction with example embodiments, it will be understood that it is not intended to limit the scope of the invention to these embodiments. On the contrary, it is intended to cover all alternatives, modifications and equivalents as may be included as defined by the appended claims.

DETAILED DESCRIPTION

While the present description focuses on processing plums to produce prunes, prune paste and prune-based products, one skilled in the art will understand that the general teachings regarding prunes may be applied to any other pitted or seeded fruits without departing from the scope of the present invention. Such pitted or seeded fruits include, but are not limited to, peaches, apricots, nectarines, mangoes, cherries, chokeberry, as well as apples and pears.

Conventional processing steps regarding fruit drying and fruit paste manufacture, include for example rehydration, high-temperature drying, freezing steps which can degrade nutrients having health-promoting properties. The techniques described herein provide a solution to avoid those steps while producing nutrient-rich fruit-based materials.

In the following description, the term "about" means within an acceptable error range for the particular value as determined by one of ordinary skill in the art, which will depend in part on how the value is measured or determined, i.e. the limitations of the measurement system. It is commonly accepted that a 10% precision measure is acceptable and encompasses the term "about".

In this description, an embodiment is an example or implementation of the inventions. The various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment.

Health Benefits from Prunes

Prunes are known to have benefits in several health domains.

Traditionally, prunes are known for their laxative effect, which can be attributed to its high fiber content and the presence of polyphenols (such as chlorogenic acid) and sorbitol.

In addition, promising evidence exists on the effect of prunes on bone health. Prunes contain polyphenols directly inhibiting osteoclasto-genesis, which leads to reduced osteoclast activity and bone resorption. Plum extract has also been shown to be effective in increasing bone calcium retention by 20%. Studies have also shown that prunes add an anabolic effect on trabecular bone in the vertebra and prevented bone loss in the tibia. Ability of prunes to prevent the loss of total body BMD in older, osteopenic postmenopausal women have also been confirmed.

It has been observed that the short-term effect of prunes, included as snacks prior to a meal, increase satiety in normal-weight individuals. In addition, one study demonstrated that a preload of prunes in comparison with a bread product before a meal resulted in lower energy intake at later meals, including lunch and the desert (910 Kcal±233 on prunes day vs 971 Kcal±249 on bread product day, P value 0.010) as well as increased satiety at all time points tested between the snack and meal.

The antioxidant property of plums has mostly been attributed to its high phenolic content. It has been demonstrated that nine different fruit juices, including plum juice, exhibited significant antioxidant effects in human plasma within 30 minutes of consumption by suppressing reactive oxygen species generation. One study confirmed the antioxidant capability of plums in young, middle-aged and elderly adults. After consumption of 195 g of plum twice a day for 5 days, there was a significant increase from baseline in urinary 6-sulfatoxymelatonin (an antioxidant) and total antioxidant capacity levels. Similarly, it was observed that following consumption of the Queen Garnet™ plum juice, there was a threefold increase in hippuric acid excretion (a potential biomarker for total polyphenols intake and metabolite), an increase in urinary antioxidant capacity and a reduction in malondialdehyde excretion, which is a biomarker for oxidative stress.

This effect on cognition has mainly been attributed to the antioxidant property of plums as a result its high polyphenolic content. It was observed in animal studies that there was an improvement in cognition with the plum juice. Plum consumption protected against oxidative stress induced by radiation with special attention to spatial learning. Studies have also shown that plum possesses prophylactic ability against radiation-induced metabolic disorders and also improved spatial learning. The plum supplemented diet had a significant beneficial effect on spatial memory and learning. There was also a significant reduction in expression of cerebral beta-amyloid, which is evident in Alzheimer's disease.

The effect of prunes on reducing risk factors for cardiovascular disease may be associated with anti-oxidative and anti-inflammatory effects and it is based on the reduction of low-density lipoprotein (LDL) cholesterol. It has been observed in adult men with mild hypercholesterolemia that supplementation with prunes significantly lowered plasma LDL cholesterol compared with a grape juice in a control group. A significantly lower fecal bile acid concentration of lithocholic acid was also reported. There was a cholesterol-lowering effect for serum total and LDL cholesterol after 12 months of plum consumption, but this was not significant and required further research.

The present plum processing techniques have been developed to create a prune paste or a prune-base product that can provide enhanced or maximized health benefits to a consumer by preserving nutrients naturally present in plums. Pre-pitting of the plums, drying at low temperatures and short drying times, enable obtaining desirable moisture content while preserving nutrients at a higher level than for typically available prunes.

Fruit Paste Implementations

It should be understood that fruit paste refers herein to a paste prepared from the corresponding fruit without any additives. For example, the prune paste refers to a paste prepared from plums. More particularly, the prune paste is produced according to several processing steps which include washing and classifying ripe plums; removing pits, petiole and other residuals from the ripe plums; subjecting the plums to a drying procedure to produce prunes and grinding the prunes to produce a prune paste.

It should be noted that grinding may encompass milling or crushing performed in a way to minimize destruction of the fibers from the prune, e.g. by keeping at least 70% of the fibers. Combined grinding and heating can vary the ratio of soluble and insoluble fibers and can increase surface area of fibers such that they can hydrate rapidly.

Referring to FIG. 1, production of the fruit paste is characterized by a preparation stage including pit, petiole and residues removal which is performed before any drying step, such that traditional rehydration steps, subsequent to the drying step and used to ease the removal of the pits, can be avoided.

Figure 2:
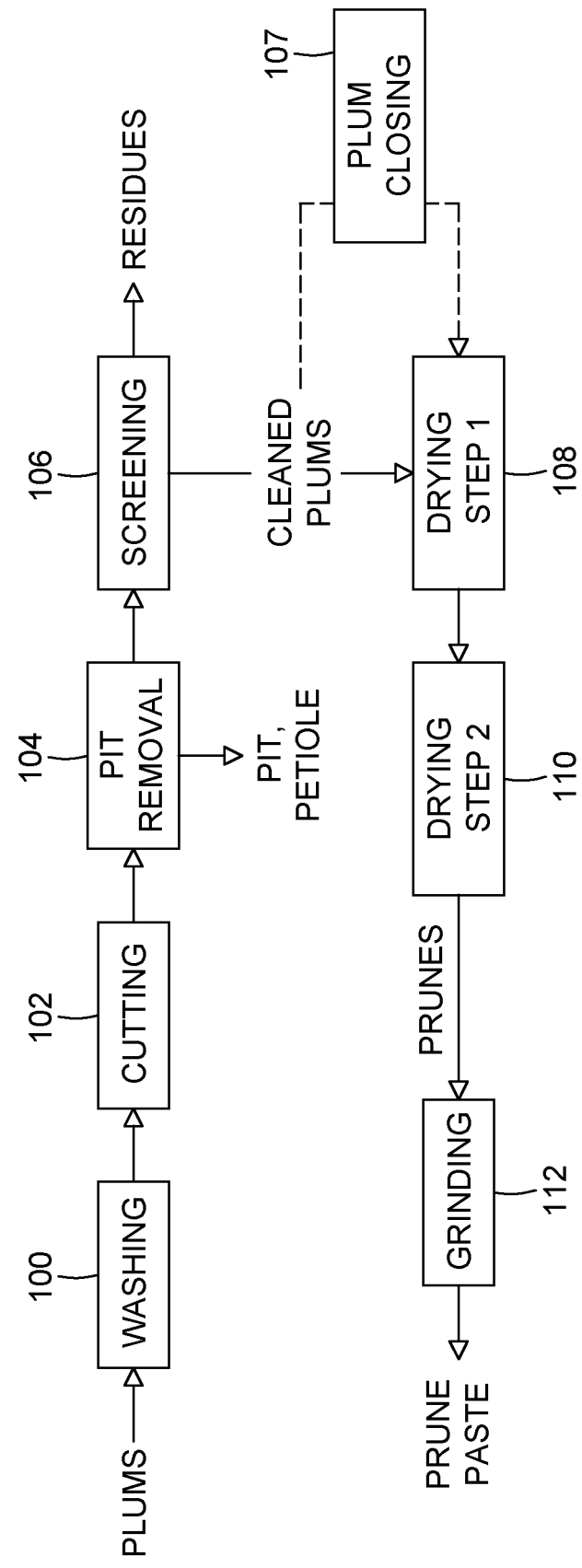
FIG. 2 is a schematic diagram of detailed process steps to produce prune paste.

Referring to FIG. 2, prune paste production (10) includes several plum preparation steps to condition the plums before drying. The plums are first pre-washed (100) and classified by size before being cut (102) for removal of the pit and petiole (104). The cut is sized to enable pit removal but is minimized to keep as much as possible of the juices and nutrients within the fruit.

A screening step (106) can be performed to ensure removal of any pit residual, fruit worms or any plums in non-desirable condition. Optionally, the plum is closed by gently pressing the fruit proximate to the cut so as to further reduce juice leaking through the aperture left by an unclosed cut. It should be understood that closing the plum refers to reducing or minimization of a gap between two parts of the plum, created by the cut, and enabling juices from the inside of the plum to be expelled and lost.

Plum cutting (102), pit removal (104), plum screening (106) and plum closing (107) may be advantageously performed manually as available mechanical means are not able to control presence of non-desirable residuals, detect unsuited plums or adequately close the cut plum. In some implementations, the plums are fully ripe and pesticide free. Optionally, the plums are cultivated organically and are non-GMO (Genetically Modified Organism). It should be further noted that the plums may be harvested by hand or by any available mechanical means.

To become prunes that have the right consistency for the future paste, prepared plums have to dried to reduce a humidity thereof. Drying is performed to obtain a prune having a moisture content between 25% and 35%, optionally between 26% and 28%. Still referring to FIG. 2, after pit removal (104) and closing plum aperture, plums are sent to the drying stage that includes at least two drying steps (108, 110) which are controlled to ensure preservation of the nutrients from the plums. It should be noted that preservation of the nutrients is related to any physical steps that avoid or reduce degradation of the nutrients from the original fruit. Preservation by addition of chemicals is not encompassed herein. Duration and temperature of each drying steps are two factors that are controlled to ensure or enhance preservation of the nutrients. The first drying step (108) is performed for a duration between 8 and 12 hours, optionally about 10 hours, and at a temperature between 40° C. and 65° C., optionally about 55° C. The second drying step (110) is performed for a duration between 3 and 5 hours, optionally 4 hours, and at a temperature between 30 and 60° C., optionally about 45° C. One skilled in the art will understand that drying time may increase with the size of the plum to be dried. The drying is performed in two steps to minimize the duration at higher temperature levels in order to reduce or prevent degradation of nutrients.

It should be noted that preservation chemicals, such as potassium sorbate, are not used in this process. It should be further understood that the process may be modified to include two or more drying steps tailored to different temperature levels to ensure slow drying without departing from the scope of the present invention.

In some implementations, these two drying steps are performed in a conventional dryer with hot air circulating system at atmospheric pressure where the prepared plums are for example arranged on wood or stainless steel slats in one layer to optimize drying.

In other implementations, the drying steps can be performed under vacuum to further preserve nutrients from the fruit and the drying temperatures can be controlled in an autoclave.

Once the prunes have reached the desired moisture content through drying steps, they are processed to be converted into prune paste. One skilled in the art will note that paste is to be understood as a soft or semi-soft mass having a substantially smooth consistency. The paste results from grinding the fruit such that the paste is extrudable but keep fibers from the fruit substantially intact. Calibration of the grinding may be performed such that lumps greater than 3 mm are not present within the paste.

Still referring to FIG. 2, prunes undergo grinding (112) in order to obtain a prune paste having a moisture content between 20% and 30%, optionally about 25%. In some implementations, grinding may be performed by using UNGER™ system for meat grinding including different sizes of sieves. It should be noted that the prunes may be grinded immediately after the drying stage such that the grinding may benefit from the fact that the prunes are still warm. Alternatively, prunes can be stored before grinding.

It should be further noted that traditional prunes or prune paste refer to herein to prunes or prune paste produced by process already and typically available in the art including high-temperature drying, aeration treatment and rehydration.

It should also be noted that various plum species may be used in the present process implementations, including the European plum (*Prunus domestica*) and Japanese plum (*Prunus salicina*). Plum species may be selected according to its nutrients contents.

Fruit-Based Product Implementations

Processing techniques encompass production of nutritive products derived from the produced prune paste. The prune paste that is produced according to the above described steps can be stored adequately to be prevented from drying or mixed immediately with at least one additional nutrient-rich material according to the desired final nutritive prune-based product.

It should be noted that use of the preparation and drying techniques according to the present invention minimizes post-processing needs and associated losses of the prune paste and enables easier integration in the final product with enhanced health properties and nutritive values. The prune-based product may be referred to as functional food which can be provided to a consumer under various forms including nutritive bars, bite-sized portions or granules. The prune-based product may be a ready-to-eat product or may be used in cooking and food preparation.

Figure 3:
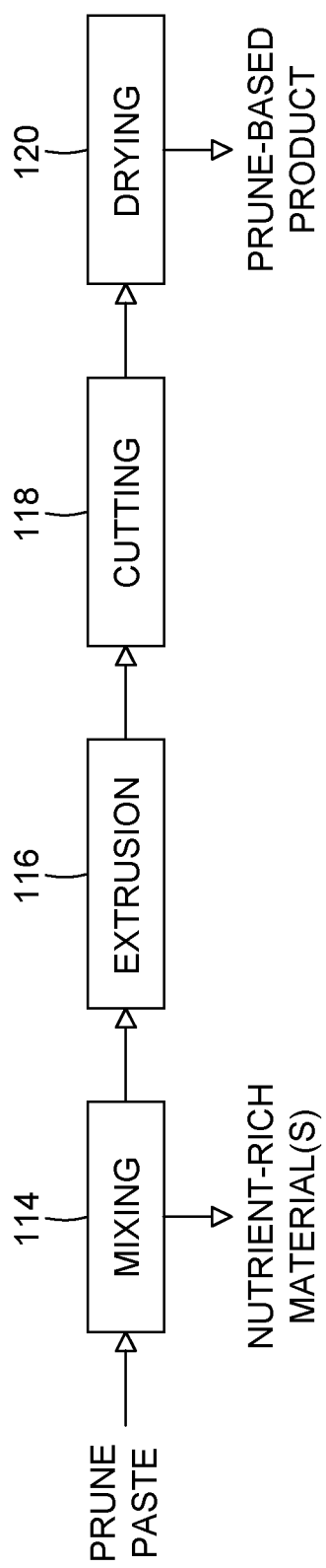
FIG. 3 is a schematic diagram of process steps to produce prune-based bars.

Referring to FIG. 3, production of the prune-based product includes a mixing step in order to combine the prune paste with at least one additional nutrient-rich material. The mixing may be performed with a standard industrial stand mixer including a hook tool at a rotation speed between 20 and 120 rpm. The speed of the mixing may be controlled to minimize degradation of the nutrients and optionally at a temperature between 25° C. and 35° C. Heating of the mixture may not be necessary if the prune paste is mixed with the additional nutrient-rich materials substantially right after the last drying step.

The resulting prune-based mixture undergo one or more conditioning steps according to the final form selected for the prune-based product. For example, referring to FIG. 3, extrusion (116) is performed to shape the prune paste to the dimensions of a bar, and cutting (118) follows to produce bar segments which size is suitable as a nutritive food portion for the consumer. The same steps may be adapted to produce a spaghetti shape, a band shape, bite shape, granules and analogs thereof. Cutting may be performed simultaneously to extrusion or subsequently to extrusion. It should be noted that the shaping techniques encompassed herein are not limited to extrusion and include any shaping techniques available to one skilled in the art to produce sized food from the prune-based mixture or prune paste. Some shaping techniques may not require a subsequent cutting step.

Optionally, the prune-based product may be coated with a layer of chocolate including dark, milk or white chocolate. Further optionally, nuts or seeds may be added to the chocolate layer. The chocolate coating step may be performed at a temperature below 31° C.

Still referring to FIG. 3, a drying step (120) is performed as a final step of the conditioning stage to finalize the prune-based product having a moisture content between 25 and 27%. Optionally, the prune-based products are let to dry at room temperature for few hours (between 12 and 24 hours).

Figure 4:
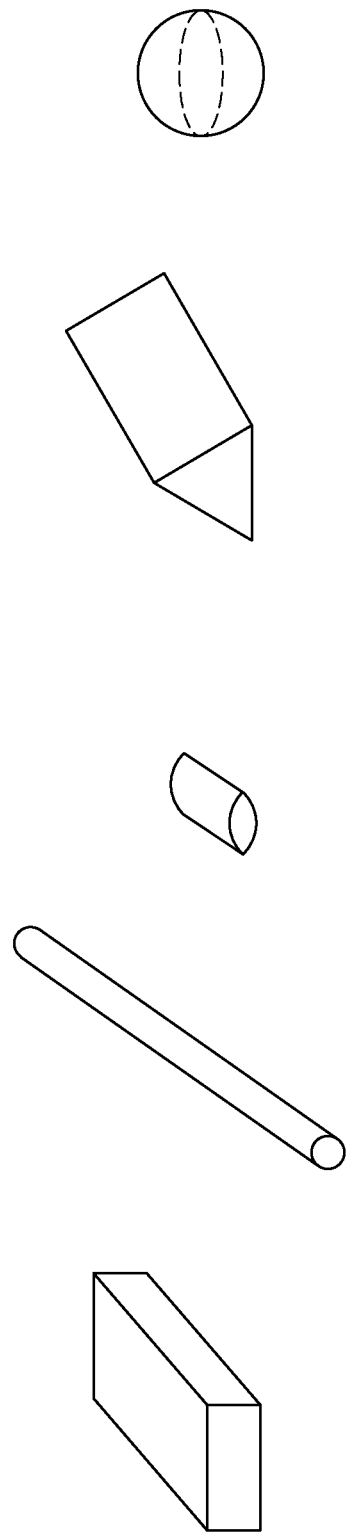
FIG. 4 is a schematic representation of a prune-based product having several shapes.

It should be noted that the prune-based product may be simply produced from pure prune paste without departing from the scope of the present invention. For example, prune paste may be extruded according to various geometries and cut to form prune bars. Few examples are illustrated on FIG. 4.

The prune-based product includes at least 80% of prune paste and at most 20% of the at least one additional nutrient-rich material. Techniques related to production of the prune-based product include selection of the at least one additional nutrient component to be slowly mixed with the prune paste.

As mentioned above, the prune-based product is prepared to serve as functional food or supplement having laxative, antioxidant and anti-inflammatory characteristics and improving iron deficiency and/or insufficiency (anemia), cognitive function, bone health while decreasing cardiovascular risk factors. The at least one nutrient-rich material may be selected among beans, seeds and spices containing nutrients that can provide additional benefits or enhance targeted health benefits from the prune, while providing a satisfactory taste to the consumer. Beans, seeds and spices may be grinded into powder before combination with the prune paste. Additionally, the at least one nutrient-rich material may be selected among micro-nutrients under a concentrate form, including concentrates of vitamin D, vitamin A and calcium, in the form of pre-made liquid concentrate, powder or beads to be added in the prune paste during the mixing step.

In some implementations, the nutrient-rich material is selected to synergistically enhance the bioavailability of a targeted nutrient from the prune-based mixture. A combination of nutrient may indeed be used to allow better absorption and bioavailability of one nutrient which can enhance health benefits therefrom. For example, vitamin C is known to favor absorption of iron.

Typically, the at least one nutrient-rich material added may be cocoa powder.

Additional nutrient-rich material may be added such as seeds including chia, sesame, raspberry, chokeberry etc. and spices such as cinnamon, vanilla, nutmeg etc.

As shown in the experimentation section, prune paste may be combined with at least one of cocoa powder, chia seeds and cinnamon, and prepared as a prune-based bar which is able to provide nutrients in a concentration and quantity that may reduce impact of the nutrient deficiency or insufficiency (anemia) or specific bone health problems. A portion of 100 g of prune-based bar may provide a non-heme iron content of at least 55% of daily value needs (optionally at least 60%, further optionally at least 68%), a vitamin K content of at least 60% of daily value needs and a potassium content of at least 32% of daily value needs.

As further shown in the experimentation section, plums dried by the present techniques produce a prune paste having a decreased content in available simple sugars, including glucose and fructose, in comparison to traditionally available prunes, thereby further enhancing potential health benefits that may result from consumption of the present prune paste or prune-based products.

It should be noted that some of the steps may be performed in different order as the one exemplified herein as readily understood by one skilled in the art. For example, the addition of the at least one rich-nutrient material can be performed before or after grinding the prunes to form a paste. Additionally, one nutrient-rich material can be added to the prunes before grinding to produce a prune paste, and another nutrient-rich material could be combined to the formed prune paste by mixing.

It should be understood that a traditionally available prune or traditional prune refers to herein as a plum dried by available industrial processes, such as those mentioned in the background section, and commercially available typical prunes.

EXPERIMENTATION RESULTS

A first example of a prune-based bar (referred to herein after as BON-BONE™) includes more than 80% of prune paste, and up to 10% of chia seeds and cocoa powder with not more than 1% of cinnamon.

Another example of a spaghetti-like prune-based product (referred to herein as Prunetti™) includes more than 90% of prune paste and less than 10% of cocoa powder.

TABLE 1

| Nutritional Facts | Unit | Value per 100 g |
| --- | --- | --- |
| Energy | kJ/kcal | 1033-1416/245-338 |
| Total fat | g | 1.9-12.8 |
| Fatty acids - total saturated | g | 1.2-6.9 |
| Fatty acids - total monounsaturated | g | 0.6-3.7 |
| Fatty acids - total polyunsaturated | g | 0.1-2.5 |
| Carbohydrate | g | 40.3-45.0 (10-15% DV) |
| Total sugars | g | 28-33.7 |
| Glucose | % | 13.7-20.5 |
| Fructose | % | 16-15.4 |
| Total dietary fibers | g | 14.7-15.8 (minimum 59% DV) |
| Protein | g | 4.6-7.6 |
| Sodium | g | 0 |
| Potassium | mg | 1066-1227.7 (minimum 32% DV) |
| Iron | mg | 10-15.2 (minimum 55% DV) |
| Vitamin C | mg | 4-7.5 |
| Vitamin K | µg | 38-51.1 (minimum 50% DV) |
| Calcium | mg | 103-115 |

As seen on Table 1, high content of prune paste (at least 50%, optionally above 80%) and high amount of specific vitamins, minerals and other nutrients can allow BON-BONE™ and PRUNETTI™ products to express substantially similar effects and health benefits as the prune itself, including laxative, anti-inflammatory and antioxidant effect of prunes as well as prevention and management of iron deficiency/insufficiency (anemia) and osteoporosis, which shows promising evidence as an adjunctive therapy.

Table 2 offers a comparison of available simple sugars percentage between traditionally available prunes and a prune prepared according to the herein defined process implementations. Table 2 shows that the present process techniques, including drying, enable a reduction of available simple sugars by at least 5%, optionally by up to 10%.

| Nutritional Facts | Unit | Paste fromTraditional Prune | Prune paste |
| --- | --- | --- | --- |
| Glucose | % | 22.51-23.38 | 13.80-20.93 |
| Fructose | % | 18.43-19.05 | 15.41-16.25 |

In addition, presence of the additional nutrient-rich materials (cocoa powder and chia seeds for example) further synergistically enhances health benefits from prunes and vice-versa.

For example, bioavailability of iron is achieved by increasing the content of nutrient enhancing iron absorption (such as vitamin C). BON-BONE™ and PRUNETTI™ provide more than 55% of daily value needs for iron per 100 g of product because the addition iron content from the cocoa powder. In addition, a higher bioavailability of the non-heme iron is achieved with the higher vitamin C content of the prune paste in comparison to traditional prunes. Indeed, the drying process according to the present invention allowed vitamin C preservation in 2 to 10 times higher concentration compared to vitamin C concentration in traditionally dried plums. Available data on traditionally produced prunes indicate for example a vitamin C content of 0.6 mg/100 g whereas the prune paste and prune-based products produced by the techniques described herein have a vitamin C content between 4 and 7.5 mg/100 g. BON-BONE™ and PRUNETTI™ may therefore be natural dietary iron sources with more than 55% of iron daily need per 100 g that can help in reducing iron deficiency and/or insufficiency (anemia). Experiments have even show that a prune-based product produced by the presently described techniques can provide up to 68%, optionally up to 75%, further optionally up to 89%, of daily value needs of iron per 100 g of product.

Further, there is increasing evidence that vitamin K positively affects calcium balance, a key mineral in bone metabolism. Vitamin K can not only increase bone mineral density in osteoporotic people but also actually reduce fracture rates. In some implementations of the process, mixing prunes as a source of vitamin K and chia seeds as a calcium source enhances beneficial effects on bone health improvement in comparison to prune itself. The process can further include combining a concentrate of vitamin D, such that interaction of vitamin D, calcium and vitamin K help decreasing bone resorption, and thus contribute to prevent osteoporosis and loss of bone mass.

The invention claimed is:

1. A process for producing a prune-based product from plums, the process comprising:
    manually removing pit, petiole and residue from the plums to produce cleaned plums;
    drying the cleaned plums according to a temperature profile tailored to produce prunes retaining at least 75% of nutrients from the plums, the nutrients comprising vitamin K, vitamin C, iron, potassium and phosphorus; and
    combining the prunes with at least one nutrient-rich material to produce the prune-based product having a moisture content between 15 wt % and 30 wt %.

2. The process of claim 1, wherein combining the prunes with the at least one-nutrient rich ingredient comprises:
   grinding the prunes to produce an extrudable prune paste having a moisture content between 20 wt % and 30 wt %; and
   mixing the prune paste with the at least one nutrient-rich material.

3. The process of claim 2, wherein combining the prunes with the at least one nutrient-rich material comprises mixing the prune paste with the at least one nutrient-rich material at a speed reducing or minimizing degradation of nutrients.

4. The process of claim 1, wherein combining the prunes with the at least one-nutrient rich ingredient comprises:
   mixing the prunes with the at least one nutrient-rich material to produce a prune-based mixture; and
   grinding the prune-based mixture to produce an extrudable prune paste having a moisture content between 20 wt % and 30 wt %.

5. The process of claim 1, wherein the drying comprises:
   subjecting the cleaned plums to a first temperature level during a first period; and then
   subjecting the plums to a second temperature level during a second period;
   the second temperature level and second duration being lower than the first temperature level and first duration respectively, to produce the prunes and where the moisture content is between 25 wt % and 35 wt %.

6. The process of claim 5, wherein the first temperature level is between 40° C. and 65° C. and the first duration is between 8 hours and 12 hours; and wherein the second temperature level is between 30° C. and 60° C. and the second duration is between 3 hours and 5 hours.

7. The process of claim 1, wherein the drying is performed to produce prunes having a content of available simple sugars decreased by at least 5% in comparison to traditional prunes.

8. The process of claim 1, wherein combining the prunes with the at least one nutrient-rich material is performed with at least 50 wt % of prunes, optionally with at least 80 wt % of prunes.

9. The process of claim 1, wherein combining the prunes with the at least one nutrient-rich material comprises selecting the at least one nutrient-rich material to synergistically enhance bioavailability of specific nutrients from the prunes.

10. The process of claim 1, wherein combining the prune paste with the at least one nutrient-rich material comprises mixing the prune paste with the at least one nutrient-rich material at a temperature between 25° C. and 35° C.

11. The process of claim 1, comprising shaping the prune-based product into a desired shape.

12. The process of claim 11, wherein shaping the prune-based product comprises at least one of:
   extruding the prune-based product into a bar shape, a spaghetti shape, or a band shape; and
   cutting the prune-based product to produce bar segments, bite-sized segments, band, spaghettis of given length or analogs thereof.

13. The process of claim 1, further comprising coating the shaped prune-based product with at least one layer of another nutrient-rich material.

14. The process of claim 1, comprising drying the prune-based product at room temperature.

15. The process of claim 1, wherein the at least one nutrient-rich material comprises seeds, beans, other fruits than plum, vegetables, spices, at least one concentrate of a nutrient or a combination thereof.

16. The process of claim 15, wherein the at least one concentrate of a nutrient comprises vitamin D, vitamin A, calcium or a combination thereof.

17. The process of claim 15, wherein the beans are cocoa beans in the form of cocoa powder and the seeds comprise chia seeds, sesame seeds, flax seeds, raspberry seeds, blackberry seeds, chokeberry seeds or related seeds.

18. The process of claim 1, comprising combining at least 80 wt % of the prune paste having a moisture content between 20% and 30%, a non-heme iron content between 10 mg and 20 mg, a vitamin K content between 48 µg and 60 µg, a vitamin C content between 5 mg and 8 mg, a potassium content between 1000 mg and 1250 mg, a calcium content between 100 and 150 mg per 100 g of prune-based product, and a content of available simple sugars decreased by at least 10% in comparison to traditional prunes.

19. A process for producing a prune paste from plums, the process comprising:
   manually removing pit, petiole and residue from the plums to produce cleaned plums;
   drying the cleaned plums according to a temperature profile tailored to produce prunes retaining at least 75% of nutrients from the plums, the nutrients comprising vitamin K, vitamin C, iron, potassium and phosphorus; and
   grinding the prunes to produce an extrudable prune paste having a moisture content between 20 wt % and 30 wt %.

20. The process of claim 19, wherein the prunes have a content of available simple sugars decreased by at least 10% in comparison to traditional prunes.

* * * * *